United States Patent [19]

Krieg

[11] 4,340,804

[45] Jul. 20, 1982

[54] WELDING NOZZLE

[75] Inventor: Adrian H. Krieg, Woodbridge, Conn.

[73] Assignee: Widder Corporation, Naugatuck, Conn.

[21] Appl. No.: 132,815

[22] Filed: Mar. 24, 1980

[51] Int. Cl.[3] .......... B23K 9/61

[52] U.S. Cl. .......... 219/137.41; 219/137.9

[58] Field of Search .......... 219/137.41, 137.51, 219/137.9, 137.42, 74, 75, 137.44, 137.61

[56] References Cited

U.S. PATENT DOCUMENTS

| | | | |
|---|---|---|---|
| 2,866,887 | 12/1958 | Kumagai | 219/137.44 X |
| 3,025,387 | 3/1962 | Kinney | 219/137.44 |
| 3,197,611 | 7/1965 | Morris et al. | 219/137.51 |
| 3,775,587 | 11/1973 | Lindkvist | 219/137.41 |
| 4,063,059 | 12/1977 | Brolund et al. | 219/137.41 X |

FOREIGN PATENT DOCUMENTS

| | | | |
|---|---|---|---|
| 521863 | 2/1956 | Canada | 219/137.61 |
| 45-253 | 1/1970 | Japan | 219/74 |
| 586972 | 1/1978 | U.S.S.R. | 219/137.41 |

*Primary Examiner*—J. V. Truhe
*Assistant Examiner*—Keith E. George
*Attorney, Agent, or Firm*—Kenneth J. Stempler

[57] ABSTRACT

A nozzle for use in connection with welding guns to scavenge welding fumes in which a flexible metal hose is provided having an opening along one wall adapted to accept a welding gun. In one embodiment, a collar is attached to the end of the hose which collar carries a plurality of electrically non-conducting screws used to properly position, locate and hold the welding gun within the flexible hose. In another embodiment, a sleeve is provided which is removably mounted to the end of the hose, the sleeve covering the welding tip during use and removable to permit welding tips to be changed without removing the gun from the flexible sleeve.

10 Claims, 4 Drawing Figures

FIG. 1
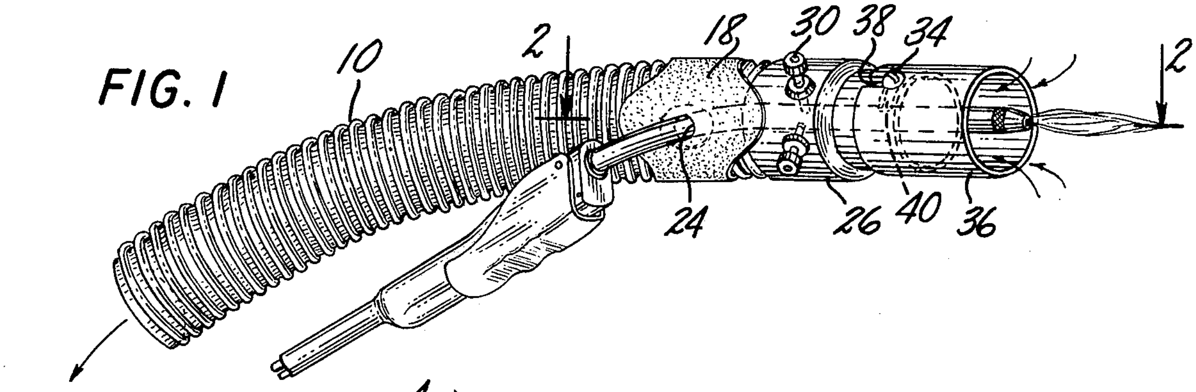
FIG. 2
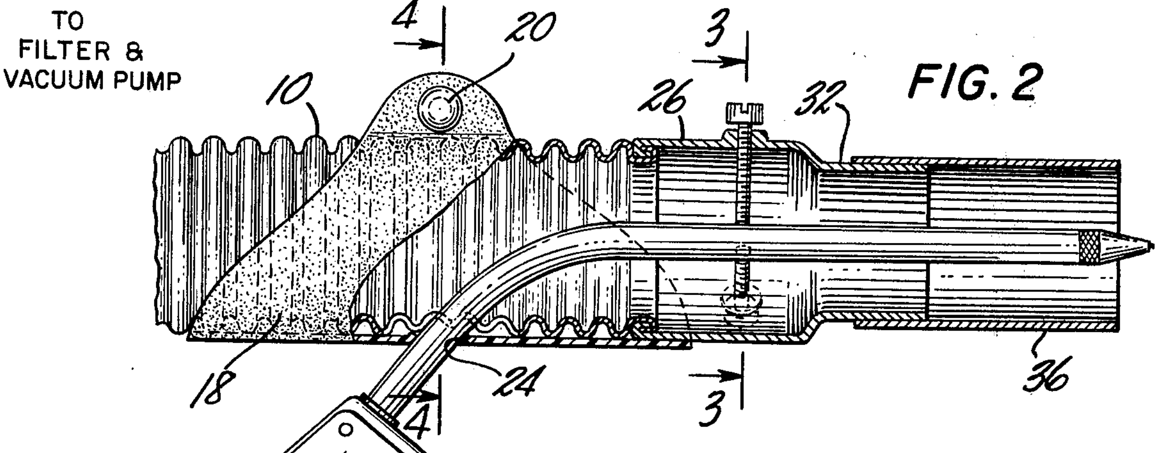
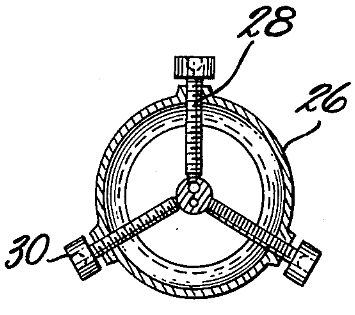
FIG. 3
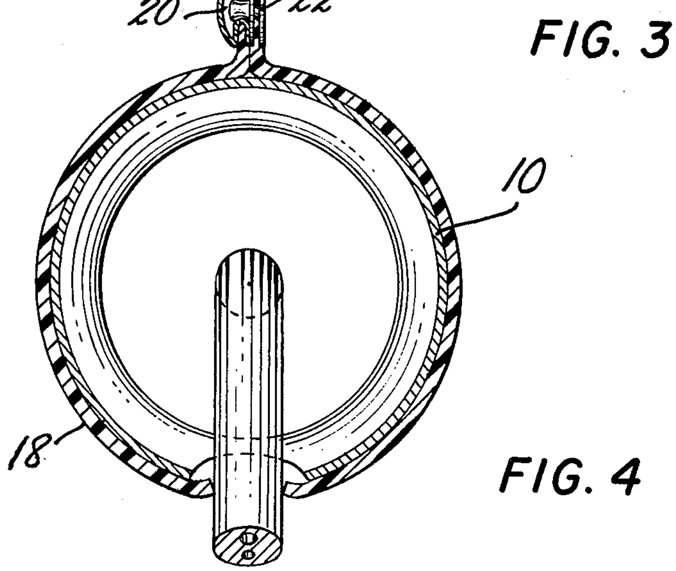
FIG. 4

WELDING NOZZLE

SUMMARY OF THE INVENTION

This invention relates to nozzles for use in connection with welding guns and more particularly to nozzles adapted to be connected to suction devices to scavenge fumes generated during the welding operation.

Welding operations produce rather substantial amounts of heat and particulate-laden fumes. To remove the fumes from the immediate vicinity of the operator, welding fume eliminators have been developed which are akin to vacuum cleaners, but having a filter for fume removal. These devices generally comprise a suction fan, a filter and a hose adapted to connect or attach directly to the welding gun. Suction applied by the fan thus acts directly at the point of welding to scavenge the fumes, filter them and exhaust the filtered air back to the atmosphere. Best results appear to require the application of suction directly at the weld.

To unite the vacuum unit to the welding gun, a rigid metal sleeve is generally provided, the sleeve having an opening along one wall to accept a welding gun. A rubber patch or other device is used to secure the welding gun in position with respect to the sleeve and a hose generally made of plastic pliable material is connected to the rear of the sleeve and to the welding fume eliminator.

The desire to apply suction as close to the weld point as possible requires that the rigid sleeve of the prior art units cover the electrode tip, leaving only as much of the tip extending from the sleeve as needed to perform the welding operation. Replacing worn tips required disassembling the welding gun from the rigid sleeve, an inconvenient operation and a dangerous one if the welding gun is not disconnected from its power source.

In addition, prior art devices positioned the welding gun within the rigid sleeve using metallic screws which, if touched by an operator or otherwise grounded, could cause electrical shock and injury.

In accordance with one aspect of the present invention, a flexible hose, preferably of metal, is employed. The hose is provided with an opening adjacent one end through which a welding gun may be inserted. The welding gun is positioned within the tube using a plurality of electrically non-conducting screws located about the periphery of the flexible hose.

For best results, the flexible hose is made of metal and preferably of segmented metal rings which cooperate to allow the hose to be bent to different shapes. Hose of this type is presently available from the Anaconda Corporation. The ability to bend the hose to various shapes permits its use with a variety of different welding guns.

In a further embodiment, a sleeve is removably secured to the end of the hose, the sleeve extending sufficiently beyond the end of the hose to cover the protruding electrode. As an extension of the flexible hose, the sleeve brings the point of suction directly adjacent the point of welding fume generation. Because of its removability, it permits welding tips to be changed without having to remove the welding gun from the metal hose.

Referring now to the drawings in which like numerals refer to like parts:

FIG. 1 is a perspective view of an assembly embodying the instant invention;

FIG. 2 is a sectional view taken along line 2—2 of FIG. 1;

FIG. 3 is a sectional view taken along line 3—3 of FIG. 2;

FIG. 4 is a sectional view taken along line 4—4 of FIG. 2.

Numeral 10 denotes flexible metal hose of the type made by the Anaconda Corporation. The hose consists of a plurality of conventional ring segments connected together and movable with respect to each other (not illustrated). The relative movability of the plurality of rings yields the advantages of rigidity normally obtained with a metal hose, along with the ability to bend the hose to assume different shapes as desired or needed at the moment.

Adjacent one end of the hose 10, a hole 12 is provided for accepting welding gun 14. As illustrated, the welding gun 14 consists of a handle and a welding head 16 mounted at an angle to the handle. To retain the welding gun in position within the flexible metal hose, a rubber patch 18 containing snap buttons 20 and 22 is provided, the patch having a hole 24 through which the gun is inserted prior to its insertion into the hole 12 in flexible hose 10. With the gun in place in the hose, the rubber patch is wrapped about the flexible hose and the snaps 20 and 22 connected to complete the initial assembly.

At one end of hose 10, a collar 26 is crimped, welded, or otherwise affixed thereto by conventional means. The collar is provided with a plurality of openings 28. Electrically non-conducting screws 30 are inserted into holes 28, the screws being long enough to extend through the walls of the hose 10 and towards its center. With the gun in place as illustrated, the electrically non-conducting screws 30 are employed to locate and hold the gun in a proper position away from the walls of the collar and the tube.

The collar is provided with a reduced diameter portion 32. A retaining screw 34 is mounted on the surface of portion 32 and is adapted to receive sleeve 36 whose inner diameter is larger enough to permit it to be slipped onto smaller diameter portion 32. As shown, sleeve 36 is slit at 38, enabling the sleeve to be simply pushed onto the collar and holding screw 34 tightened to secure it in place. Alternatively, an additional slit 40 at right angles to the slit 38 may be employed to provide a bayonette arrangement for anchoring the sleeve to collar portion 32.

As illustrated, the gun is passed through opening 12 and located within collar 26 by electrically non-conducting screws 30, which may be made of any non-conducting material such as nylon or Fibreglas, with the tip of the welding rod extending beyond the end of reduced diameter portion 32. Sleeve 36 completes the assembly, covering the welding tip except for a small portion which extends beyond the end of the sleeve as needed in order to perform the necessary welding operations. The combination of flexible hose, collar and sleeve form a vacuum tube operative at the point of fume generation and connected to a suction device and filter assembly, commonly known as a welding fume eliminator.

The flexible metal hose can take the place of presently employed plastic hoses or, if desired, a plastic hose may be attached to the end of the flexible metal hose opposite the welding end. As the flexible hose is of metal, it is better able to withstand heat generation at the point of welding than prior art plastic hoses. Additionally, because it can be bent to any shape desired, it can be employed as a universal holder in place of the rigid sleeves previously used for the purpose of holding the welding gun in place.

The non-conducting screws, described as placed in the collar and through the flexible hose, can be placed directly into the end of the flexible hose or, in the alternative, can be placed at a point along the collar which extends past the end of the flexible metal hose.

The means for releasably securing the sleeve, illustrated as screw 34, can be replaced by any conventional means, such as spring loaded screws adapted to engage holes in the sleeve. With this embodiment, the sleeve would fit within the collar rather than over the collar as illustrated in the drawing.

Many modifications will occur to those of ordinary skill in the art. It is intended to cover all such modifications which fall within the spirit and scope of the invention as defined in the claims appended hereto.

What I claim is:

1. A welding nozzle kit for use in a welding gun assembly having a welding tip comprising a flexible hose, a collar and a sleeve, said flexible hose having a hollow interior, a hole in the hose wall adjacent one end thereof, a hollow collar adapted to fit over the said end of said hose, said collar having a plurality of holes therethrough and a plurality of electrically non-conducting screws adapted to fit into the holes in said collar, means for securing the welding gun to the hose in the region of the hole, said screws being long enough to extend into the hollow interior of said collar to grip the welding gun when the screws are assembled to the said collar, a sleeve adapted to mount to said collar, the length of said sleeve being sufficiently short to permit the tip to extend beyond the end of the sleeve, and means for releasably securing said sleeve to said collar.

2. A welding nozzle kit according to claim 1 wherein said collar has a first enlarged diameter portion adapted to fit over said flexible hose, and a reduced diameter portion extending beyond the end of said hose, said sleeve being adapted to fit on said reduced diameter portion.

3. The welding nozzle kit according to claim 2 wherein said releasable means comprises a screw hole in the reduced diameter portion of said collar and a screw adapted to fit said hole, said sleeve having a slot at one end thereof adapted to embrace the shaft of said screw.

4. The welding nozzle kit according to claim 1 further comprising a patch adapted to fit around said sleeve and a welding gun in the region of the hole in said hose.

5. The welding nozzle kit according to claim 1 wherein said flexible hose is made of metal segments.

6. A welding nozzle for use in a welding gun assembly having a welding tip, comprising a flexible hose having a hollow interior, a hole in the wall of said hose adjacent one end thereof, through which a welding gun can be inserted, a collar mounted on said one end having a plurality of openings therein and a plurality of screws made of electrically non-conducting material extending through said openings and into the interior of said collar for locating and holding said welding gun; a sleeve removably mounted on said collar and providing a cover for the (electrode) welding tip of said welding gun, the length of said sleeve being sufficiently short to permit the tip (of the electrode) to extend beyond the end of the sleeve thus enabling the use of the tip for welding purposes.

7. A welding nozzle for use in a welding gun assembly having a welding tip comprising a flexible hose having a hollow interior, a hole in the wall of said hose adjacent one end thereof through which the welding tip is placed into the hollow interior of said flexible hose, a hollow collar mounted on said hose adjacent said hole and a plurality of screws in said collar and extending toward the interior thereof, said screws being movable toward and away from the center of said hose to grip and release the welding gun carried therein, said screws being made of a non-conducting material, said welding tip extending beyond the end of said collar, and means for securing the flexible hose in place on the welding gun.

8. The welding nozzle according to claim 8 wherein said flexible hose is made of metal segments.

9. The welding nozzle according to claim 8 further comprising a sleeve removably mounted on said collar, said sleeve covering a portion of said welding tip.

10. The welding nozzle according to claim 9 wherein said means for securing the flexible hose comprises a patch adapted to fit around said sleeve and the welding gun in the region of said hole.

* * * * *